United States Patent [19]

Lerner

[11] 4,060,891
[45] Dec. 6, 1977

[54] WIRE STRIPPER

[76] Inventor: Henry C. Lerner, 1220 Sunset Plaza Drive, Los Angeles, Calif. 90069

[21] Appl. No.: 697,972

[22] Filed: June 21, 1976

[51] Int. Cl.[2] .................. B26B 27/00; H02G 1/12
[52] U.S. Cl. .................................................. 30/90.1
[58] Field of Search .............. 81/9.51, 9.5 R, 9.5 A; 30/90.1

[56] References Cited

U.S. PATENT DOCUMENTS

| 1,314,759 | 9/1919 | Silvernail | 81/9.5 R |
| 3,285,103 | 11/1966 | Oehlerking | 81/9.51 |

FOREIGN PATENT DOCUMENTS

| 2,342,243 | 3/1974 | Germany | 81/9.5 R |

Primary Examiner—James L. Jones, Jr.
Assistant Examiner—Roscoe V. Parker

[57] ABSTRACT

A wire stripper for stripping the insulation off small gauge size conductors is provided by securing a die having a guide hole therethrough onto the upper end of a supporting bar. A flat elongated flexible blade has its lower end clamped to the back surface of the bar and a V-shaped notch on its upper cutting edge extending partly across the opening of the guide hole in the die. Upon inserting the free end of an insulation coated conductor into the front end of the guide hole of the die, the flexible blade is bent backwardly to enable the coated conductor to slide past the cutting edge of the blade. When the cutting edge is at the point on the coated conductor where the stripping is to start, the coated conductor is pulled out of the guide hole. This causes the blade to straighten out against the back surface of the bar while exerting a large force on its upper cutting edge which severs the bottom and side portions of the coating and crushes the opposite upper portion of the coating against the square upper edge of the guide hole. Thus, continued pulling of the coated conductor causes the weakened upper portion of the coating to tear apart such that the bare wire can be longitudinally slid out of the severed portion of the insulation.

11 Claims, 6 Drawing Figures

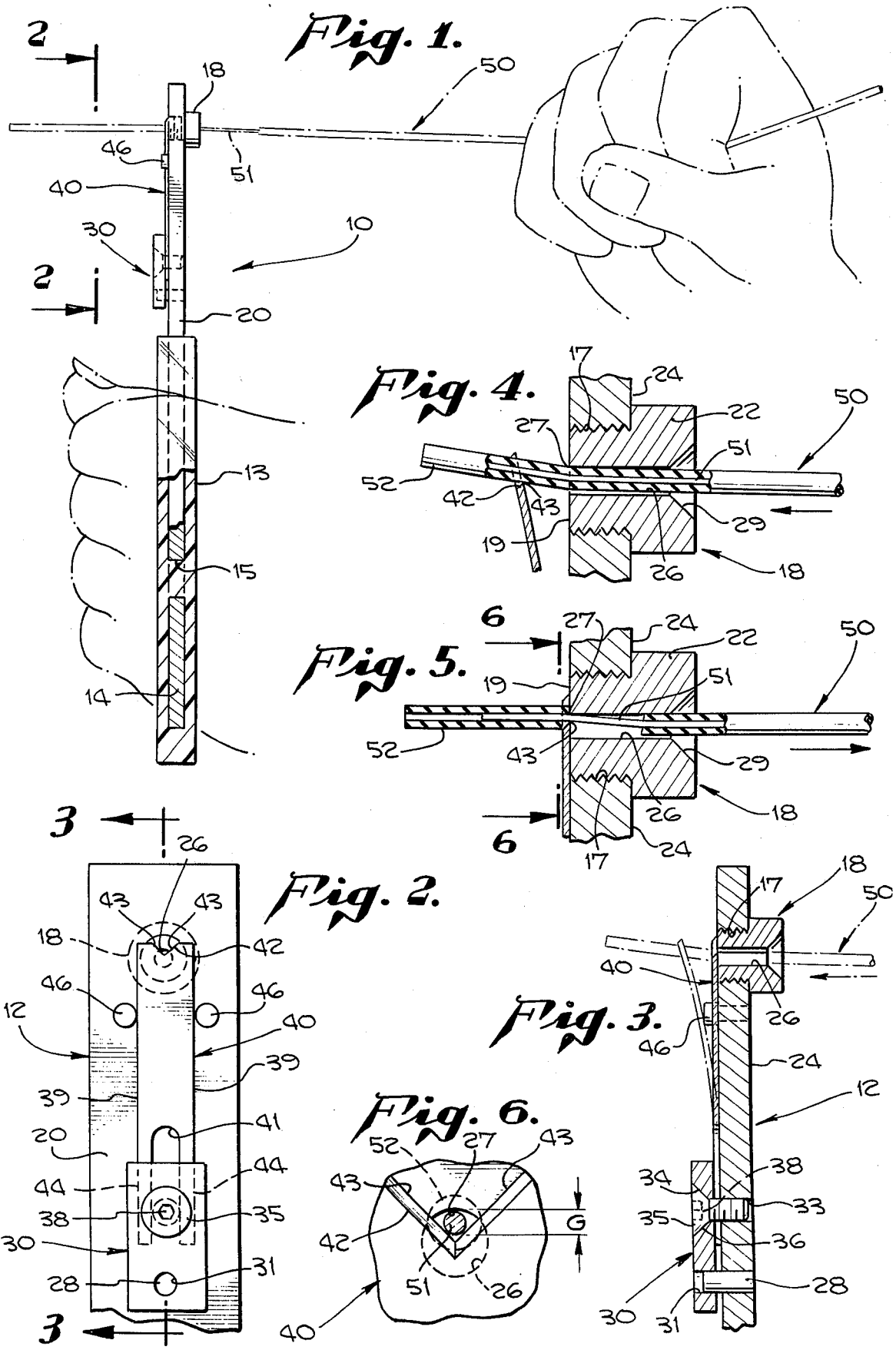

4,060,891

WIRE STRIPPER

BACKGROUND AND SUMMARY OF THE INVENTION

This invention relates to improvements in devices used for stripping insulation from wires.

Because of the trend toward using smaller size printed circuit boards and integrated circuit type components in the fabrication of electrical equipment, smaller gauge size discrete conductors are being associated with this equipment. As the gauge sizes of these conductors become smaller, it becomes increasingly more difficult with the wire strippers presently available in the art to strip the insulation coating from the free ends thereof as required to enable these conductors to make electrical contact with the miniaturized circuits of such equipment.

According to the teachings of the present invention a wire stripper is provided comprising a support bar having inserted on the upper end thereof a die having a guide hole therethrough. An elongated flexible blade has its lower end clamped to the flat back surface of the bar and its upper cutting end extending part way up into the opening of the guide hole. During operation of the wire stripper, the inserting of the free end of an insulation coated wire to be stripped into the front of the guide hole causes the flexible blade to be automatically bent backwardly about its lower clamped end as the coated wire slides along the upper cutting edge thereof. When the cutting edge of the blade is positioned at the point where it is desired to sever the insulation coating, the coated wire is pulled out of the front of the guide hole. This causes the flexible blade to automatically straighten out against the flat back surface of the bar. This action results in a large force being exerted on the cutting edge of the blade which causes the opposite upper portion of the insulation coating on the wire to be crushed against the square edge provided on the rear of the guide hole and severs the bottom and side portions of the insulation coating. Continued pulling on the coated wire then tears apart any weakened portion of insulation coating not yet severed such that the bare wire portion of the coated wire can be pulled off of the severed insulated end portion which cannot pass through the opening provided between the blade cutting edge and the upper edge of the guide hole.

It is the primary object of the present invention to provide a wire stripper device that can be readily used to strip insulation coating off small gauge conductors.

Another object of the present invention is to provide a new and improved wire stripper device that may be inexpensively manufactured and hence marketed at a low cost.

Still another object of the present invention is to provide a wire stripper device that can be readily adjusted for stripping insulation coatings off different gauge size wires or conductors.

These and other objects and features of the present invention will become better understood through a consideration of the following description when taken in conjunction with the accompanying drawings.

DRAWING SUMMARY

FIG. 1 is a side view showing of a wire stripper device embodying the present invention and illustrates the operation thereof;

FIG. 2 is a back view of the upper half of the wire stripper device as taken in the direction of arrows 2—2 of FIG. 1;

FIG. 3 is a sectional view taken along lines 3—3 of FIG. 2 and illustrates the free end of a wire with a coating of insulation being inserted into the device;

FIG. 4 is an enlarged sectional view of the upper portion of the device shown in FIG. 3;

FIG. 5 shows the device stripping the wire of its coating of insulation; and

FIG. 6 is a sectional view taken in the direction of arrows 6—6 of FIG. 5.

DETAILED DESCRIPTION OF THE INVENTION

Referring to the drawings, the wire stripper device 10 of the present invention comprises a support member in the form of an elongated body 12 made of a light metal such as aluminum. The bar has a molded plastic coating 13 on the lower handle portion 14 thereof. The bar 12 is provided with a threaded hole 17 on the upper end thereof for receiving the threaded body of a cylindrical guide member or die 18. The die 18 is preferably made of a hardened steel. When secured on the bar 12, the back end 19 of die 18 is flush with the flat back surface 20 of the bar and the shoulder of a flange 22 on the front end of die 18 is seated up against the front surface 24 of the bar 12. The providing of the flange 22 on the die 18 lengthens a hole 26 extending therethrough which serves as an enlarged guide hole for an insulated wire or conductor 50 which is to be stripped of its insulation coating. The rearward end of the guide hole 26 in the die 18 is provided with a square edge 27 while its forward end is provided with a beveled edge 29.

Disposed on the bar 12 below the die 18 is a clamp 30 in the form of a small rectangular plate. The clamp 30 has a hole 31 on the lower portion thereof by which it is slidably mounted on a pin 28 secured on the bar. The clamp 30 also has a countersunk hole 34 located on the upper portion thereof. The tapered shoulder 36 of a flat head screw 35 is seated in the hole 34 when the screw 35 is advanced into a threaded hole 33 provided in the bar.

Positioned on the back of the bar 12 is a blade 40 in the form of an elongated flat leaf spring made of a hardened and tempered steel such as employed for watch springs. The blade which is generally rectangularly shaped is on the order of being five times longer than it is wide and has a thickness on the order of 0.005 inches. The sides 39 of the blade 40 are straight and parallel. The upper end of the blade is provided with a V-shaped notch 42 whose sides are ground at an acute angle with respect to the front surface of the blade, as best shown in FIG. 5, to provide a cutting edge 43. The lower portion of the plate 40 is provided with an elongated slot 41.

As shown in FIGS. 2 and 3, the lower portions of the sides or legs 44 of the slot 41 fit about the body of screw 35 such that only these leg portions of the blade 40 are held by clamp 30 against the surface 20 of the bar 12 by tightening screw 35. Note that clamp 30 is mounted to slide on pin 28 with its surface maintained parallel to the back surface 20 of the bar as the screw is tightened to assure that the legs 44 of the blade 40 are securely held between the adjacent parallel surfaces of the clamp and the bar.

As shown in FIG. 2, locating pins 46 are secured on the bar 12 on either side of the upper portion of the blade 40. The pins 46 are used to center the blade 40 at the set up of the device 10 and also serve to prevent the blade from moving sidewise relative to the hole 26 in the die 18 when an axial force is exerted on its upper cutting edge 43 during the operation of the device 10.

The upper end or cutting end of the blade 40 is positioned during setup of device 10 with its V-shaped notch extending up into the area that would otherwise be exposed in the guide hole 26 of the die 18. During the set up of the device 10, with the blade 40 on the back surface 20 of the bar freed to move by loosening the screw 35 on the clamp 30, a wire gauge standard corresponding to the diameter of the bare wire to be stripped is inserted in the guide hole 26 of the die 18. The blade 40 is then pushed up until the cutting edge 43 of its V-shaped notch 42 contacts the wire gauge standard. The screw 35 on the clamp 40 is then tightened to securely clamp the legs 44 of the slot 41 against the back of the bar. This repositioning of the blade cutting edge 43 relative to the upper edge 27 of the guide hole 26 in the die 18 is facilitated by use of a hexagonal or Allen head wrench engaging an opening 38 (FIG. 3) on the flat head screw 25.

It should now be clear that by providing for the adjusting of the cutting edge 43 of the blade relative to the guide hole 26 of the die 18 in this manner, suitable provision is provided for the stripping of different size or gauge conductors by means of the stripper device 10.

As illustrated in FIG. 6, the opening so provided between the cutting edge 43 of the V-shaped notch 42 on the upper end of the blade and the upper edge 27 of the die hole is designated G. This opening may be precisely equal to the gauge or diameter of the bare wire 51 to be stripped of its insulation coating 52 or it may be made just slightly larger than the diameter of the bare wire.

The operation of the wire stripper device 10 is as follows. The plastic covered handle portion 14 of the bar 12 may be conveniently grasped in one hand of the person using it, as illustrated in FIG. 1. Otherwise the bar 12 may be secured in a fixed position as by fastening it to the edge of a workbench by passing a screw (not shown) through the plastic covering 13 at the location of a mounting hole 15 provided on its handle portion. The free end of an insulated conductor or wire 50 to be stripped need then be merely inserted into the beveled front opening of guide hole 26 of the die by use of the other hand. It should be noted that insulated conductor 50 tends to assume a slight upward angle as it enters the opening on the rear of the guide hole 26 provided by the V-shaped notch 42 on the upper end of the blade 40. As illustrated in FIGS. 3 and 4, upon pushing the insulated conductor 50 through the guide hole 26 of the die 18, the drag of the conductor 50 on the upper end of the blade 40 causes the latter to be bent backwardly about its clamped legs 44 away from the surface of the bar 12.

It should now be clear that the lower portion only of legs 44 of the slot 41 on the blade are held by the clamp 30 so as to facilitate the readily bending of the body and, therefore, the upper cutting edge 43 of the blade back away from the guide hold 26 during the operation of the stripper device 10.

Now then, the insulated coated wire 50 is forced into the guide hole 26 for a distance that is determined by how much of the insulating coating 52 is to be severed from the free end of the wire 51. Thus, when the V-shaped notch 42 on the upper end of the blade assumes a position at a point on the insulation coated wire 50 where the stripping is to start, the movement of the coating wire is reversed, i.e., the coated wire 50 is pulled out of the guide hole 26.

The cutting edge 43 on the upper end of the cantilevered held blade 40 acts upon the insulation coating 52 at its point of engagement therewith such that upon the start of withdrawal of the coated conductor 50 out of the die 18, the cutting edge 43 of the blade will catch in the insulation coating 52. Continued pulling of the coated conductor 50 then causes the cutting edge 43 of the blade to dig into the insulation coating 52 as the blade swings inward and straightens out against the rear flat surface 20 of the bar 12. This causes the cutting edge 43 of the blade to move up and thereby sever a substantial portion of the insulation coating located along the bottom and sides of the wire (FIG. 6). Simultaneously with this action, the large upwardly force exerted on the coating of conductor 50 which results from the balde straightening out as the conductor 50 is pulled causes the upper surface of the insulation coating 52 to be smashed or crushed against the square edge 27 on the rear upper end of the guide hole 26 on the die 18. As illustrated in FIG. 5, this considerably weakens the upper portion of insulation coating 52 such that the pull on the coated conductor 50 causes any unsevered portion of the coating to readily tear apart. Thus, continued pulling of the coated wire 38 then causes the free end of the wire 51 to slide longitudinally off of the severed section of the insulation coating 52 which latter remains on the rear side of the guide hole 26 in the die 18.

The pushing of the free end of coated conductor into the guided hole 26 of the stripper die 18 automatically pushes, i.e., swings the upper cutting edge 43 of the flexibly held blade 40 away from the guide hole 26 in the die 18. This action permits the free end of the coated conductor 50 to advance through the guide hole 26 until the cutting edge 43 of the blade engages the coated conductor at the point where it is desired for the stripping of the wire to commence. Then when the coated conductor 50 is pulled in the opposite direction to withdraw it from the guide hole 26, the upper cutting edge 43 of the blade automatically digs into the coating 52 as the blade straightens out upon being moved up against the rear surface 20 of the bar 12. This action severs the coating 52 as above described such that continued pulling removes the stripped free end of the wire 51 from the severed end portion of the coating 52 that is not able to pass through the opening defined by the V-shaped notch 42 and the upper rear edge 27 of the guide hole 26.

It should now be clear from the above that the operation of stripping a conductor of its insulating coating is greatly simplified by the use of the device 10 of the present invention. Furthermore, the conductor is not objectionally scored in any way as a result of this operation.

It should be especially noted that the blade 40 being made of a high quality steel string does not buckle when it is pulled back by the pulling action on the conductor onto the back surface 20 of the bar and thus subjected to an axial load by the contacting of its upper cutting edge with the insulated conductor. Instead, the blade straightens out and assumes a position flat against the back surface. This causes the upper cutting edge 43 to move upwardly relative to the die and results in the large upwardly exerted force thereon which severs the insulation coating 52.

The device 10 readily strips insulation coating from wire having sizes on the order of AWG 22 to AWG 30 when the insulation is made of vinyl or materials of similar toughness. In order to strip wires of insulation made of tougher type materials such as Teflon or Kynar the operation may be facilitated by rotating the portion of the coated conductor gripped in the hand (FIG. 1) in a circle for a few times. This rotating action assures that the insulating coating is substantially cut all around by the cutting edge 43 of the V-shaped notch 42 so as to facilitate severing of the coating.

While the description has been concerned with a particular structural embodiment of the present invention, it is to be understood that many modifications and variations in the construction and arrangement may be provided for without departing from the spirit and scope of the invention or sacrificing any of its advantages. The invention is therefore considered as including all such possible modifications and variations coming within the legitimate and valid scope of the appended claims.

Having described the invention, what is claimed as new in support of Letters Patent is:

1. A wire stripper device comprising:
   a support member have a flat back surface,
   a die mounted on the upper end of said support member, said die having a guide hole therethrough with a square corner on the rear upper edge thereof lying in the plane of the back surface of the support member,
   an elongated flat flexible blade having a notched cutting edge on the upper end thereof, and
   clamping means for clamping the lower end of the blade to the back surface of said support member with the upper cutting edge of the blade lying in the plane of said flat back surface and spaced from the upper edge of the guide hole to provide an opening which is of a size to pass the bare wire but not the insulation coating of a conductor to be stripped.

2. The wire stripper device in accordance with claim 1 wherein the notched cutting edge on the upper end of said blade is V-shaped.

3. The wire stripper device in accordance with claim 1 wherein said blade has an elongated slot on the lower end thereof the sides of which are clamped by said clamping means.

4. The wire stripper device in accordance with claim 1 wherein said blade is formed of a flat strip of spring steel.

5. The wire stripper device in accordance with claim 4 wherein the thickness of said flat strip of spring steel is on the order to .005 inches.

6. The wire stripper device in accordance with claim 5 wherein the length of said blade is approximately five times the width thereof.

7. The invention in accordance with claim 1 wherein an opening is provided on the lower portion of the support member for use in attaching it to a workbench.

8. The invention in accordance with claim 1 including guide pins attached to the back surface of said support member on either side of said blade.

9. The wire stripper device in accordance with claim 1 wherein said support member has a pin secured on the back surface thereon and said clamping means comprises a plate having a hole in the lower end thereof slidably fitted on said pin, and a flat head screw having a tapered shoulder, said screw passing through a countersunk hole on the upper edge of said plate with its shoulder seated therein when the body of the screw is threadedly engaged in an opening in said member.

10. The wire stripper device is accordance with claim 1 wherein said die is made of hardened steel.

11. A wire stripper device comprising:
   a support member having a flat back surface,
   a guide member mounted on the upper end of said support member, said guide member having a guide hole therethrough with a square corner on the rear upper edge thereofl,
   an elongated flat flexible blade having a V-shaped cutting edge on the upper end thereof, and
   clamping means for clamping the lower end of the blade to the back surface of said support member with the upper cutting edge of the blade spaced from the upper edge of the guide hole to provide an opening on the back of the guide hole which is of a size to pass the bare wire but not the insulation coating of a conductor to be stripped,
   whereby when the free end of the coated conductor is pushed into the front end of the guide hole the blade is caused to be swung back as the coated conductor slides along the cutting edge thereof; and
   whereby when the coated conductor is pulled out of the guide hole the cutting edge of the blade digs into the coated conductor as the blade straightens out against the back surface of the support member causing the upper portion of the coating on the conductor to be crushed against the rear upper edge of the guide hole while severing the lower and side portions of the coating, the continued pulling on the coated conductor causing the coating to be separated such that the bare wire can be longitudinally slid out of the severed free end of the coating.

* * * * *